Nov. 19, 1968 K. D. SWANDER 3,411,417

ADD-ON BRAKE ACTUATOR WITH MECHANICAL RELEASE FEATURE

Filed Jan. 31, 1967

INVENTOR
Kenneth D. Swander

BY Scofield, Kokjer, Scofield & Lowe
ATTORNEYS

United States Patent Office 3,411,417

Patented Nov. 19, 1968

1

3,411,417

ADD-ON BRAKE ACTUATOR WITH MECHANICAL RELEASE FEATURE

Kenneth D. Swander, Overland Park, Kans., assignor to Certain-Teed Products Corporation, Ardmore, Pa., a corporation of Maryland Filed Jan. 31, 1967, Ser. No. 612,936
3 Claims. (Cl. 92—63)

ABSTRACT OF THE DISCLOSURE

A spring emergency brake of the "add-on" type (the spring chamber exterior or outwards of the service brake chamber) with emeregency spring back-off or mechanical release means associated therewith The spring back-off means requiring correct replacement of same after use to prevent air pressure leakage from the unit. The spring back-off means requiring removal of a plate from the unit and unthreading and rethreading of a release tool co-operating with said plate. The spring back-off means externally visible of the unit when operative and thus a warning to the vehicle operator.

*Background of the invention*

The general intent of all spring brake actuators is to provide a means of applying the foundation service brakes on one or more axles of a vehicle when same has lost its normal air pressure required to operate the service brake chambers. Under these conditions it is considered operating as an emergency brake or secondary stopping means. When the air pressure that is introduced to the spring mechanism air chamber is controlled by the driver and only exhausted after a vehicle is brought to a stop with its service brakes, then it is considered a parking brake.

"Add-on" units are basically spring brake chambers that are attached to a portion of the existing service brake chamber that is already mounted on the vehicle. The "add-on" type transfers the spring force through a sealed common inner wall, thence to the pressure side of the normal service brake diaphragm, then through the brake application rod and mechanism to the brake shoes, whether it is a cam or wedge brake mechanism. Many previously designed "add-on" actuators have had some type of threaded mechanism to permit either the compressing or the relaxing of the power spring for either installing convenience or releasing the spring force that would be applying the brakes and preventing the vehicle from being moved.

*Summary of the invention*

The invention basically comprises a device which will apply brakes by spring force when the air pressure in the system drops below a predetermned value. It also will allow this spring force to be released by jack screw action while the air pressure is low. Furthermore, it is so arranged that it will be readily apparent to visual inspection that this spring force has been mechanically released.

An object of the instant invention is to provide an improved "add-on" emergency and parking brake system particularly incorporating an improved mechanical release with a spring brake.

Another object of the invention is to provide an improved "add-on" type of emergency and parking brake actuating mechanism which can be economically manufactured, is sturdy in construction, has a longer service life, is easy to assemble and install and has new and improved features of construction, arrangement and operation.

Another object of the invention is to provide an improved mechanical release construction for a spring emer-

2 gency brake of the "add-on" type which is so constructed and arranged as to eliminate the objections and failure hazards heretofore present in similar units.

Another object of the invention is to provide a mechanical release device for an "add-on" type emergency and parking brake for vehicles wherein the spring emergency brake may be released or backed off to a greater or lesser extent for vehicle movement or brake maintenance by means of the mechanical release means.

Another object of the invention is to provide a mechanical release device for an "add-on" type spring emergency and parking brake for vehicles wherein, to release the emergency or parking spring, the operator must remove a shield plate from the brake housing, removing an internally threaded sleeve from within the housing, replace the shield plate, insert the internally threaded sleeve through the plate and thread same onto means connected to the piston and recompress the spring. Furthermore, to return the brake to regular operation, the above described steps must be completely performed in reverse order.

Other and further objects of the invention will appear in the course of the following description thereof.

*Detailed description*

In the drawings, which form a part of the instant specification and are to be read in conjunction therewith, an embodiment of the invention is shown.

Figure 1:
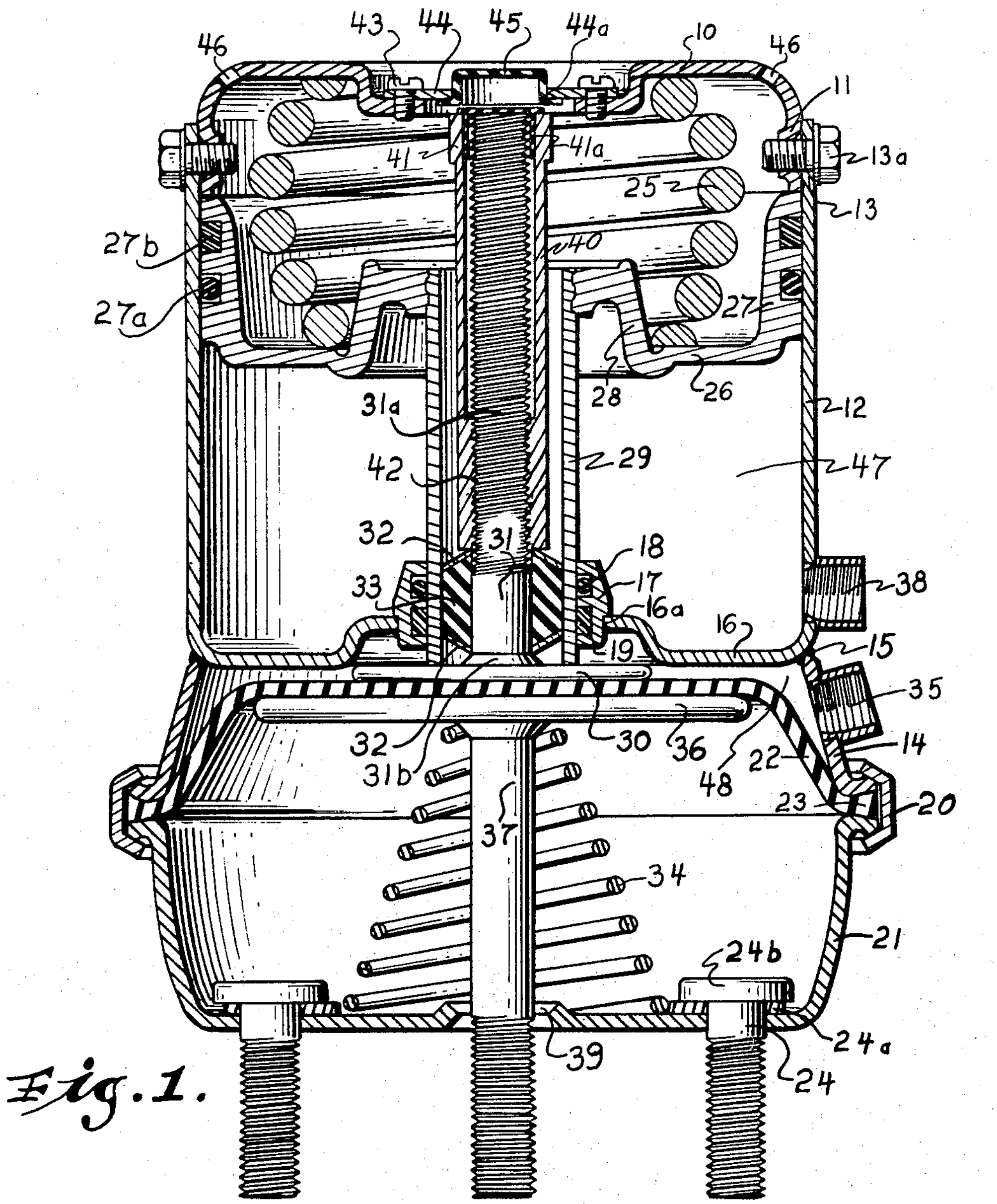
FIG. 1 is a side sectional view of an emergency and parking brake assembly including, as a part thereof, the "add-on" unit which is the subject of the instant disclosure.

Referring to FIG. 1, spring support 10 is provided with tapped holes at 11. Cylinder 12 is provided with matching, untapped holes 13 Cap screws 13*a* connect spring support 10 to cylinder 12. Cylinder extension 14 is connected by weld 15 circumferentially to the inward end (with respect to the axle or brake) of cylinder 12. Cylinder 12 has partially closed end 16 with circular hub 17 received centrally thereof in opening 16*a*. O-ring 18 and nylon bushing 19 are located in inwardly facing grooves in hub 17.

End piece 21, comprising the inward extension of the conventional service brake chamber, is removably connected to cylinder 12 extension 14 by clamp band 20. Clamp band 20 is made of two pieces and is tightened by two bolts which are not shown. As the clamp band 20 is tightened, it compresses edge 23 of rubber diaphragm 22 between cylinder extension 14 and end piece 21, thereby forming a seal against leakage of compressed air. End piece 21 is further provided with two bolts 24 which have reinforcements 24*a* under their heads 24*b*. Bolts 24 are welded to reinforcements 24*a* and the latter to end piece 21 so that they will not turn with reference to it.

Coil spring 25 bears against the inside surface of spring support 10 and the top or outer surface of piston 26. Piston 26 is provided with outwardly extending skirt 27, the latter containing circular, outwardly facing grooves which receive O-ring 27*a* and felt wiper ring 27*b*. Piston 26 is also formed with central hub 28 to which is attached inwardly extending thrust tube 29.

Circular plate 30 is positioned at the inward end of thrust tube 29. Push rod 31 is welded at its inward edge to the outward surface of plate 30. Belleville washer 32 and rubber shaft seal 33 are located in the annular space between push rod 31 and the inside of tube 29. The upper portion 31*a* of push rod 31 is threaded.

Referring now to the service brake chamber as defined between the inward wall 16 of cylinder 12 and the inward end wall 21*a* of end piece 21, circular plate 36 is welded, on its inward surface, to brake operating rod 37. Diaphragm return spring 34 bears at its outward end against the inward surface of plate 36 and at its inward end against the end wall of piece 21. A clearance hole 39 for brake operating rod 37 is provided centrally of end wall 21*a* of end piece 21. An opening for the input of compressed air to the space between diaphragm 22 and end wall 16 of cylinder 12 is provided at 35. An input opening for flow of compressed air to the space between the inward side of piston 26 and end wall 16 is provided at 38. These latter passages or openings are inwardly threaded or tapped with a pipe thread.

Release tool or sleeve 40 is substantially of tubular configuration and is provided with a hexagonal nut exterior of its upper end at 41 and with interior threads 42 at its inward end, the latter threading and mating with exterior threads 31*a* of push rod 31. The portion of the inner surface of sleeve or tool 40 above internal threads 42 thereof is of greater internal diameter than the external diameter of the exterior threading 31*a* of push rod 31. A molded plastic thread cover 41*a* is inserted between the outer surface of push rod 31 at the outer end thereof and release tool 40 at the outer end of both members.

Cover plate 44 comprising a circular disc with a central opening 44*a* therein, is attached removably to spring support 10 by means of four screws 43 which fit into tapped holes in spring support 10, extending through openings registering therewith in cover plate 44. A button plug 45 is inserted in central opening 44*a* and removably held there by friction.

Air release holes are provided at 46 in spring support 10. The space between piston 26 and end wall 16 fed by opening 38 is designated 46. The space between diaphragm 22 and end wall 16 of cylinder 12 is designated 47.

In normal operation of a braking system, compressed air is introduced into space 47 via opening 38. Same pushes piston 26 outwardly, against the action of spring 25, until the outward edge of skirt 27 comes into contact with the inward edge of spring support 10. This is the position seen in FIG. 1. O-rings at 27*a* and 18 seal off chamber 47 and prevent leakage of compressed air. Piston 26 carries with it, to its outward position, tube 29, push rod 31, and circular plate 30 on the latter.

Under this condition, the service brake can be applied by introducing air through opening 35 into chamber 48. This action pushes diaphragm 22 inwardly from the position shown in the view of FIG. 1, and consequently moves circular plate 36 and brake applying rod 37 inwardly. The service brake can be released by allowing air to flow out of opening 35. When same is done, diaphragm return spring 34 expands and pushes circular plate 36 outwardly. Same also moves brake applying rod 37 and diaphragm 22 outwardly also.

Chamber 48 is sealed against leakage of compressed air by O-ring 18, shaft seal 33 and the edge 23 of diaphragm 22 compressed between cylinder extension 14 and end piece 21 by clamp band 20.

If, for any reason, the pressure of compressed air drops below a safe value, in the entire braking system, the air pressure in air chamber 47 is reduced and emergency spring 25 expands, thereby pushing piston 26 inwardly toward end wall 16. Tube 29 being attached at its outward end to piston 26, same also moves inwardly, also pushing circular plate 30 and push rod 31 therewith. Further, plate 30, through diaphragm 32, and the assembly of plate 36 and brake applying rod 37, by such movement, act to apply the brake.

The function of the mechanical release system for compressing spring 25 in the absence of air pressure in chamber 47 will now be described. The most common reason for utilizing the backoff function is the desire to remove the "add-on" assembly at clamp band 20 (or the entire assembly at bolts 24). A typical reason for this would be the failure in the unit somewhere whereby air pressure inserted opening 38 would fail to back off the piston (releasing the spring load). This might be a seal failure at 27*a*. By providing a mechanism for removal of the "add-on" unit assembly, such new unit may be inserted as an entire unit without changing the brake adjustment. Additionally, repair or replacement to diaphragm 22 or any part in the "add-on" unit assembly or in the service brake assembly may be effected by this separation. Another common use for the backoff is at original installation on a vehicle, on an assembly line, whereby the vehicle may be moved thereabove.

Additionally, sometimes it is desirable to move the vehicle when compressed air is not available. This is particularly true if same is obstructing traffic, or is in a dangerous location such as on a raiload track. This can be done for whatever purpose by going through the following mechanical backoff procedure.

Screws 43 are removed and cover plate 44 is taken off. A hexagonal socket wrench with an extension handle (such as is generally available for spark plug removal) is inserted through the central opening in spring support 10 and fitted over the hexagonal exterior of the outward end of release tool or sleeve 40. Tool or sleeve 40 is completely unthreaded from the threaded portion of push rod 31 and removed from the unit. It should be noted, incidentally, that the overall length of tool 40 is sufficient when the outward end 41 of tool 40 and the outward end of threaded portion 31*a* of rod 31 are in alignment, as in FIG. 1, that the inward end of sleeve 40 bears against, tightens and radially expands Belleville washers 32 and shaft seal 33 whereby to lock push rod 31 to tube 29. The inward end of rod 31 is enlarged as at 31*b* to provide a bearing surface for such action.

Button plug 45 is thence removed from the central opening 44*a* of cover plate 44 and cover plate 44 is reinserted on spring support 10. The outside diameter of tool or sleeve 40 inward of the hexagonal exterior portion 41 thereof will pass through opening 44*a* in cover plate 44, but the hexagonal exterior portion 41 will not pass through this hole. The inward end of tool or sleeve 40 is inserted through opening 44*a* and again threaded over the upper threaded portion 31*a* of push rod 31. Tool or sleeve 40 acts as a jack screw and pulls push rod 31 outwardly. Thus the assembly of circular plate 30, tube 29 and attached piston 26 are moved outwardly, with push rod 31 whereby to compress spring 25. As plate 30 moves outwardly, the diaphragm return spring 34 expands thereby moving circular plate 36, attached brake applying rod 37 and diaphragm 22 outwardly, thus releasing the brakes.

The actuator can be restored to normal operating condition by reversing this mechanical backoff procedure. Tool or sleeve 39 is unthreaded from push rod 31 externally threaded portion 31*a*, cover plate 44 is removed from spring support 10. Tool or sleeve 40 is again rethreaded and replaced on push rod 31 in the position of FIG. 1, button plug 44 reinserted in hole 45 and the cover plate 44 again put back on spring support 10 by replacing screws 43.

It is dangerous to operate a vehicle with the emergency spring 25 in the fixed, mechanical release condition (backed off by the action previously described). Thus, if the air pressure should fail working in chamber 48, it would be impossible to stop the vehicle. One major advantage of this actuator is the fact that, if tool or sleeve 40 does not project outside cover plate 44, it is in normal, safe operating condition. This is readily apparent to the vehicle operator, on even a cursory inspection, as the outward end of the emergency and parking brake assembly, the spring support 10, is readily in view.

Felt ring 27*b* is saturated with oil before assembly and serves to lubricate the inner wall of cylinder 12, thereby minimizing wear of O-ring 27*a* and maintaining the seal against leakage of compressed air. The inside diameter nylon bushing 19 is slightly less than the inside diameter of hub 17. Therefore, as tube 29 moves inwardly or outwardly, it bears against the nylon bushing 19 and not against the metal surface of hub 17. Nylon is a good bearing material against metal, because the coefficient of friction is low and it does not wear away quickly. This is particularly true where there is little lubrication such as oil or grease.

In the event of tool 40 not being returned to the position seen in FIG. 1, namely, with its outward end flush with the outward end of rod 31, whereby to force seal 33 against the inner surface of tube 29, restoration of air pressure in chamber 48 through orifice 35 will cause air leakage through tube 29 and out orifices 46. This is audible and a further warning in addition to the visual evidence of extension of tool 40 out spring support 10.

Figure 2:
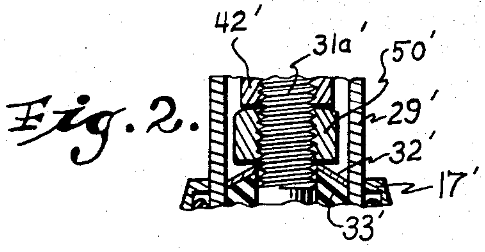
FIG. 2 is a fragmentary view of the inward end of the push rod seen centrally of FIG. 1 showing the alternative of a seal locking nut mounted thereon.

FIG. 2 shows a modification of the structure of FIG. 1 wherein a nut 50' replaces an equivalent length of the inward end 42 of tube 40 whereby to provide a permanent seal lock of resilient means 33' against the inside surface of tube 29' whether tool 40 is in proper place or not. All other structures are the same in this modification and thus, in FIG. 2, like numbers are applied to the corresponding parts, but primed.

From the foregoing, it will be seen that this invention is one well adapted to attain all of the ends and objects hereinabove set forth together with other advantages which are obvious and which are inherent to the structure.

Having thus described my invention I claim:

1. Brake actuating mechanism comprising
- a closed housing having inner and outer end walls,
- a flexible diaphragm within said housing and peripherally secured in place,
- means for introducing fluid under pressure to said housing adjacent the outer end wall thereof and at the outer side of said diaphragm,
- a brake operating rod on the other side of said diaphragm axially arranged relative thereto,
- said rod projecting through the inner end wall of the housing for reciprocatory movements,
- a disc-like pad on the end of said brake rod adjacent said diaphragm,
- an open-ended auxiliary cylinder at the outer end of said housing,
- the outer end wall of said housing constituting the inner end wall of said cylinder,
- said outer end wall of said housing having a central opening therethrough
- the outer end of said cylinder closed by an outer wall member also having a central opening therethrough,
- a piston slidably fitting within said cylinder with the outer side thereof facing the outer wall member of said cylinder,
- coil compressed spring means seating between said piston outer side and cylinder outer wall member,
- a hollow tubular piston rod connected centrally to said piston, extending inwardly thereof, and having a sliding fit through the housing outer end wall central opening,
- an elongate externally threaded rod centrally located within said piston rod and extending outwardly of the outer side of said piston, means sealingly connecting said externally threaded rod to said piston rod,
- an internally threaded hollow sleeve threadably engaging with a said externally threaded rod and moveable there along to and fro by threading and ungaging with said externally threaded rod and movethreading action, said hollow sleeve being carried entirely within said cylinder during normal operation of said brake actuating mechanism,
- a disc-like pad on the inner end of the externally threaded rod of greater outer diameter than the piston rod and adapted to abut the outer side of the diaphragm,
- a centrally perforated plate removably fixed to said cylinder outer wall member by securing means and overlying the central opening through said cylinder outer wall, the perforation in said plate being of lesser area than the area of the opening in the cylinder outer wall member,
- said externally threaded rod and the more inward portion of said internally threaded sleeve both being of lesser outer diameter than the diameter of the perforation in the removable plate,
- the outermost external portion of said internally threaded sleeve being of greater outer diameter than the diameter of the removable plate perforation and of lesser diameter than said central opening in said cylinder outer wall whereby to be able to cooperate with the plate in spring backoff action,
- and means for introducing fluid under pressure to said cylinder adjacent the housing outer end wall for normally holding the piston in the region of the cylinder outer wall member thereby to hold said coil compression spring means under compression.

2. Brake actuating mechanism as in claim 1 including a frictional seal connection between the externally threaded rod and the internal surface of said hollow tubular piston rod, the threading of the sleeve on the externally threaded rod operating to seal said connection.

3. Brake actuating mechanism as in claim 1 including a frictional seal connection between the externally threaded rod and the internal surface of said hollow tubular piston rod,
- a nut threaded on said externally threaded rod inwardly of said sleeve operative to seal said connection.

References Cited

UNITED STATES PATENTS

| | | | |
|---|---|---|---|
| 3,090,359 | 5/1963 | Hoppenstand | 92—63 X |
| 3,101,219 | 8/1963 | Herrera | 92—63 X |
| 3,112,959 | 12/1963 | Kateley | 92—63 X |
| 3,152,521 | 10/1964 | Cruse | 92—63 |
| 3,175,473 | 3/1965 | Boteler et al. | |
| 3,187,642 | 6/1965 | Cruse | 92—63 X |

MARTIN P. SCHWADRON, *Primary Examiner.*

I. C. COHEN, *Assistant Examiner.*